United States Patent
Ohno

(10) Patent No.: US 8,296,770 B2
(45) Date of Patent: Oct. 23, 2012

(54) SYSTEMS AND METHODS FOR ALLOCATION OF HARDWARE RESOURCE TO TASKS ACCORDANCE WITH THE DEVICE-BASED RELATIVE VALUE FOR EACH OF THE FIELD DEVICES

(75) Inventor: Takeshi Ohno, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1049 days.

(21) Appl. No.: 12/092,918

(22) PCT Filed: Aug. 11, 2006

(86) PCT No.: PCT/JP2006/315911
§ 371 (c)(1),
(2), (4) Date: May 7, 2008

(87) PCT Pub. No.: WO2007/055055
PCT Pub. Date: May 18, 2007

(65) Prior Publication Data
US 2009/0235264 A1    Sep. 17, 2009

(30) Foreign Application Priority Data

Nov. 8, 2005    (JP) ................................. 2005-323563

(51) Int. Cl.
*G06F 9/46* (2006.01)
*G06F 15/173* (2006.01)
(52) U.S. Cl. ......................... 718/103; 718/104; 709/226
(58) Field of Classification Search ........................ None
See application file for complete search history.

(56) References Cited

U.S. PATENT DOCUMENTS

| | | | |
|---|---|---|---|
| 6,505,250 B2 | 1/2003 | Freund et al. | |
| 2004/0205206 A1* | 10/2004 | Naik et al. | 709/230 |

FOREIGN PATENT DOCUMENTS

| | | |
|---|---|---|
| CN | 1225472 A | 8/1999 |
| CN | 1264078 A | 8/2000 |
| JP | 06-075786 A | 3/1994 |
| JP | 06-324888 A | 11/1994 |
| JP | 07-253893 A | 10/1995 |

(Continued)

OTHER PUBLICATIONS

Chinese Office Action issued in Chinese Application No. 200680041703.2 dated Oct. 19, 2011 (with full translation) (9 pages).

(Continued)

*Primary Examiner* — Camquy Truong
(74) *Attorney, Agent, or Firm* — Sughrue Mion, PLLC

(57) ABSTRACT

The allocation of hardware resources to distribution applications is enabled without using effective task priority available only in field devices. A distribution system makes a plurality of field devices connected with each other through a network (N) operate a plurality of distribution applications (distribution AP) in parallel. The distribution system is provided with an importance adjustment unit (3) that calculates relative values indicative of the task priority in the field devices in accordance with the importance of the distribution AP designated for every distribution AP and a resource allocation unit (13) that allocates the hardware resources of each field device to each of the tasks of which the distribution AP are composed in accordance with the relative values in the field devices calculated by importance adjustment unit (3).

2 Claims, 12 Drawing Sheets

FOREIGN PATENT DOCUMENTS

| | | |
|---|---|---|
| JP | 07-282013 A | 10/1995 |
| JP | 10-215492 A | 8/1998 |
| JP | 2000181884 | 6/2000 |
| JP | 2001-051716 A | 2/2001 |
| JP | 2001325041 | 11/2001 |
| JP | 2002-318702 A | 10/2002 |
| JP | 2004-054803 A | 2/2004 |
| JP | 2004-206692 A | 7/2004 |

OTHER PUBLICATIONS

Japanese Action, dated Sep. 6, 2011, issued in corresponding JP Application No. 2005-323563, 2 pages in Japanese.
Office Action dated Jun. 25, 2012 in Chinese Patent Application No. 200680041703.2.

* cited by examiner

RESOURCE ALLOCATION MANAGEMENT TABLE  *301*

| DISTRIBUTED AP IDENTIFIER | DISTRIBUTED AP IMPORTANCE | NUMBER OF TASKS | TASK IMPORTANCE | |
|---|---|---|---|---|
| | | | RELATIVE VALUE AREA | ABSOLUTE VALUE AREA |
| 1 | 3 | 3 | 3 | 4~6 |
| 2 | 1 | 3 | 3 | 1~3 |

FIG.6

RESOURCE ALLOCATION MANAGEMENT TABLE 302

| DISTRIBUTED AP (IDENTIFIER) | DISTRIBUTED-AP-BASED TASK (IDENTIFIER) | DEVICE (IDENTIFIER) | DISTRIBUTED-AP-BASED RELATIVE VALUE | | TASK IMPORTANCE ABSOLUTE VALUE | DEVICE-BASED RELATIVE VALUE | |
|---|---|---|---|---|---|---|---|
| | | | DISTRIBUTED AP1 | DISTRIBUTED AP2 | | DEVICE 1 | DEVICE 2 |
| 1 | a | 1 | 2 | | 5 | 3 | |
| 1 | b | 1 | 1 | | 4 | 2 | |
| 1 | c | 2 | 3 | | 6 | | 3 |
| 2 | a | 1 | | 3 | 3 | 1 | |
| 2 | b | 2 | | 2 | 2 | | 2 |
| 2 | c | 2 | | 1 | 1 | | 1 |

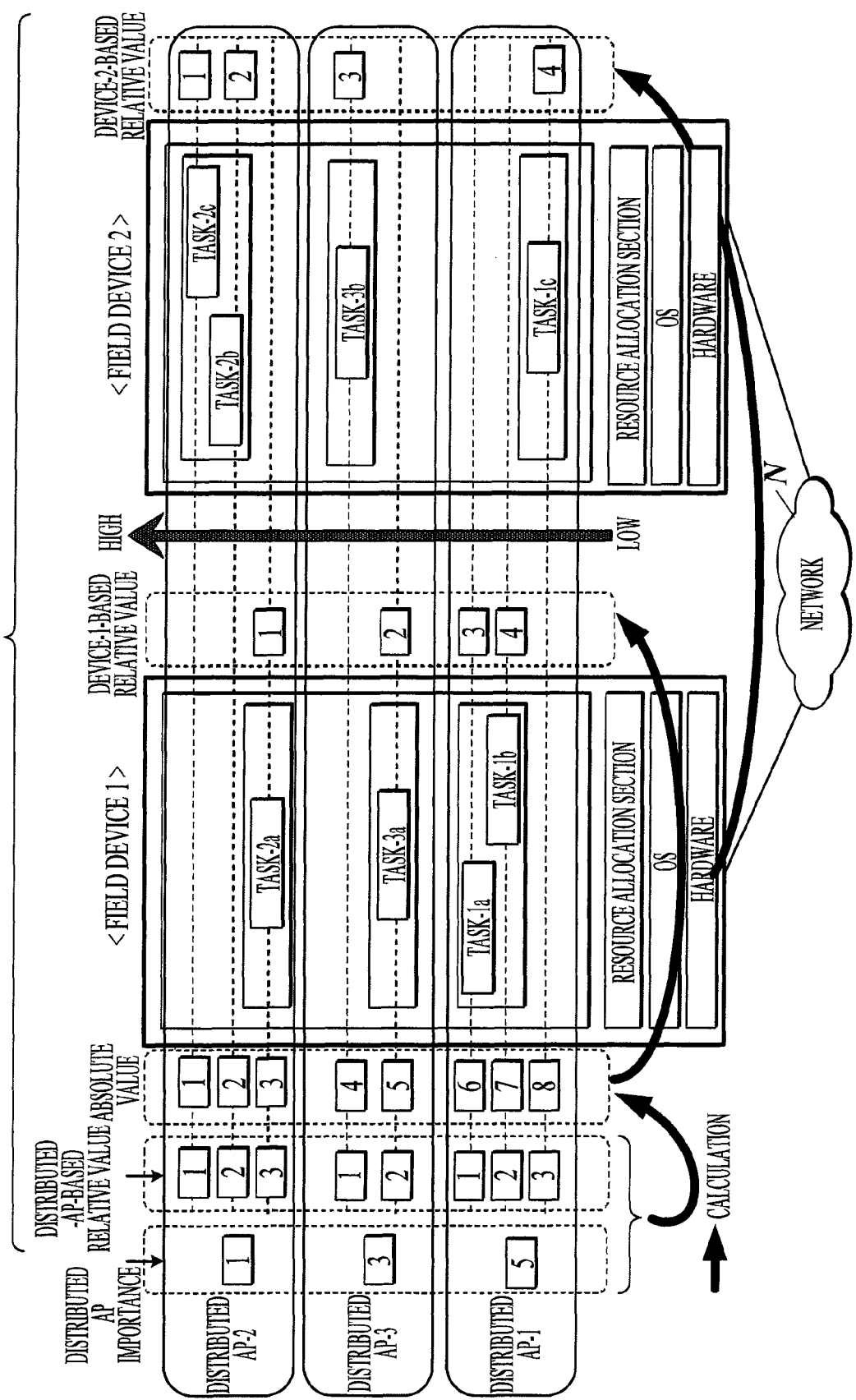

FIG.11

RESOURCE ALLOCATION MANAGEMENT TABLE 303

| DISTRIBUTED AP IDENTIFIER | DISTRIBUTED AP IMPORTANCE | NUMBER OF TASKS | TASK IMPORTANCE | | |
|---|---|---|---|---|---|
| | | | RELATIVE VALUE AREA | OVERLAP AREA | ABSOLUTE VALUE AREA |
| 1 | 3 | 3 | 3 | 0 | 2~4 |
| 2 | 1 | 3 | 3 | 2 | 1~3 |

FIG.12

RESOURCE ALLOCATION MANAGEMENT TABLE 304

| DISTRIBUTED AP (IDENTIFIER) | DISTRIBUTED-AP-BASED TASK (IDENTIFIER) | DEVICE (IDENTIFIER) | TASK IMPORTANCE | | | | |
|---|---|---|---|---|---|---|---|
| | | | DISTRIBUTED-AP-BASED RELATIVE VALUE | | ABSOLUTE VALUE | DEVICE-BASED RELATIVE VALUE | |
| | | | DISTRIBUTED AP1 | DISTRIBUTED AP2 | | DEVICE 1 | DEVICE 2 |
| 1 | a | 1 | 2 | | 3 | 2 | |
| | b | 1 | 1 | | 2 | 1 | |
| | c | 2 | 3 | | 4 | | 3 |
| 2 | a | 1 | | 3 | 3 | 2 | |
| | b | 2 | | 2 | 2 | | 2 |
| | c | 2 | | 1 | 1 | | 1 |

FIG.15A
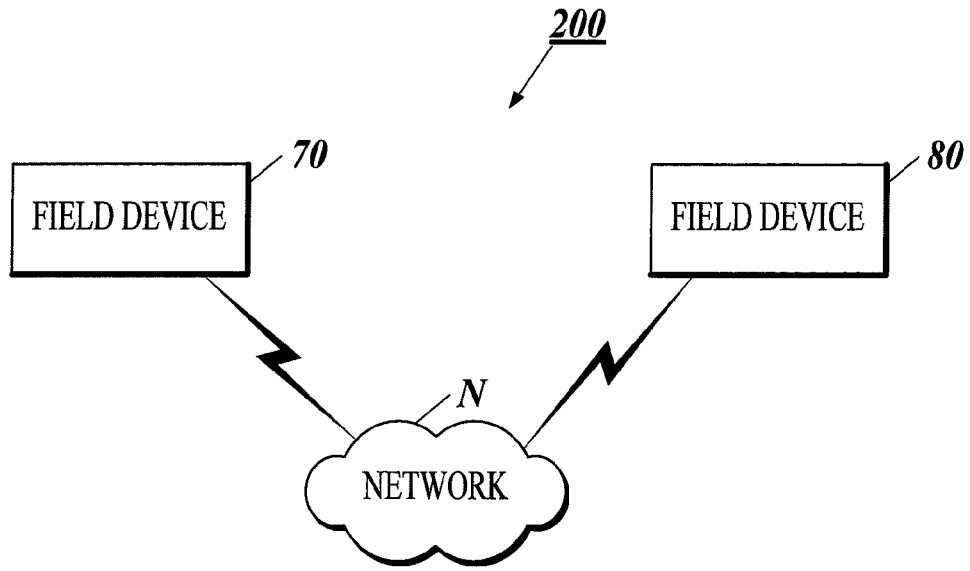
FIG.15B
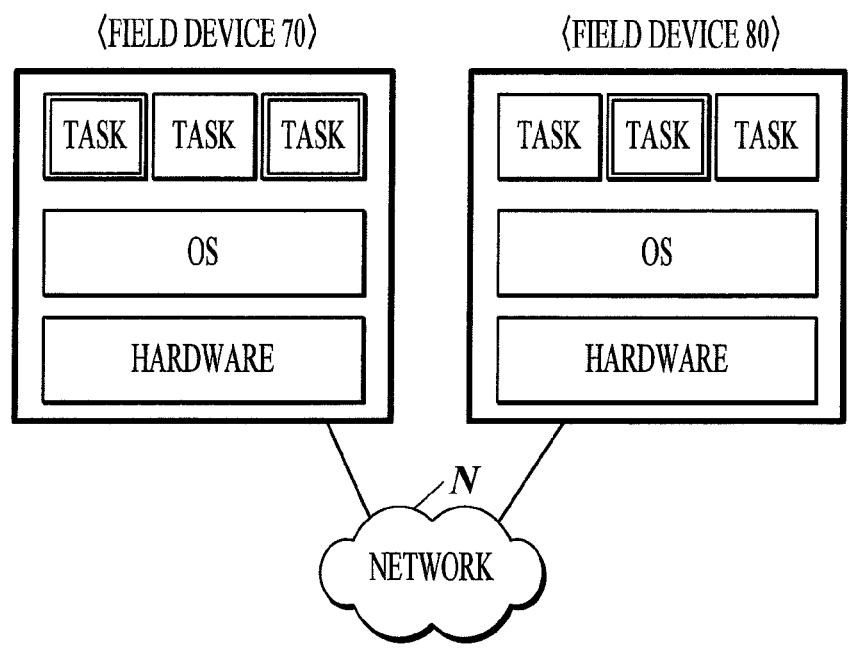
 :CONSTITUTE DISTRIBUTED AP1
 :CONSTITUTE DISTRIBUTED AP2

SYSTEMS AND METHODS FOR ALLOCATION OF HARDWARE RESOURCE TO TASKS ACCORDANCE WITH THE DEVICE-BASED RELATIVE VALUE FOR EACH OF THE FIELD DEVICES

TECHNICAL FIELD

The present invention relates to a distributed system in which a plurality of field devices interconnected through a network run a plurality of distributed applications in parallel.

BACKGROUND ART

In recent years, various proposals have been made to a distributed system in which various kinds of devices on a field (hereinafter referred to as "field devices") are interconnected through a network (for example, see Patent Literature 1 to 4). FIG. 15A shows a configuration of a conventional distributed system 200. The distributed system 200 is a system in which field devices 70 and 80 are connected to each other through a network N. The network N is a network such as a public line, a telephone line, an ISDN line, a wireless communication line, an exclusive line, a CATV line, an optical communication line. The number of field devices constituting the distributed system 200 is not limited to a special value.

Examples of the distributed system as described above include a PA (Process Automation) system, an FA (Factory Automation) system, a broadband monitoring/control system, a measuring system, an industrial/social system. Examples of the field devices constituting the distributed system include a network device such as a sensor, an actuator, a controller, a communication measuring instrument, a measurement instrument, an IC tester, a camera, a router, a switch or the like.

A processing flow when the distributed system 200 runs a plurality of distributed applications in parallel will be described with reference to FIG. 15B. A distributed application is an application implemented in the distributed system by allocating functions constituting the distributed application to field devices as tasks and executing the tasks in cooperation with one another. The distributed application will be hereinafter referred to as "distributed AP".

When running the distributed AP, it is necessary to assign task priorities of the field devices to the tasks constituting the distributed AP. A task priority is an OS-specific index which is used to allocate a CPU (Central Processing Unit) of the field device to a task by an OS (Operating System) and which represents order of priority of the task processing. A task having a higher task priority is executed prior to a task having a lower task priority. Tasks having the same priority are equally time-divisionally processed. Here, the task is equivalent to a process or a thread, and these will be representatively called as "task".

In the distributed system 200, one or more field devices in which tasks are executed are first determined. For example, as shown in FIG. 15B, when each of two distributed APs (a distributed AP1 and a distributed AP2) has three tasks, the field device 70 is determined as a field device which executes two tasks of the distributed AP1 and one task of the distributed AP2, and the field device 80 is determined as a field device which executes the remaining one task of the distributed AP1 and the remaining two tasks of the distributed AP2. When one or more field devices for executing tasks are determined, one or more hardware resources necessary for the tasks are allocated by using OS functions of the field devices. With respect to the order of priority of the processing, a task priority specific to an OS is designated. When a plurality of tasks are executed by a single field device, the order of priority among the tasks is determined, and the task priorities specific to an OS are allocated.

Patent Literature 1: Japanese Patent Application Laid-Open No. 10-215492
Patent Literature 2: Japanese Patent Application Laid-Open No. 2001-51716
Patent Literature 3: Japanese Patent Application Laid-Open No. 2002-318702
Patent Literature 4: Japanese Patent Application Laid-Open No. 2004-54803

DISCLOSURE OF INVENTION

Problem to be Solved by the Invention

However, the conventional distributed system has the following problem.

Since a task priority is dependent on an OS, the task priority is not determined unless a field device which executes the task is determined. Accordingly, it is impossible to determine a task priority of each task when distributed APs are developed or designed. Moreover, since a task priority is an absolute value index of an OS, every time a task is added to a field device, it is necessary to manually redesign priorities of all the tasks executed in the field device. Furthermore, since a distributed AP includes a plurality of tasks which are to be executed by a plurality of field devices, it is impossible to determine the task priorities of the distributed AP under a single OS. Therefore, it is necessary to adjust the task priorities of all the tasks constituting the distributed AP for each OS. When running a plurality of distributed APs in a plurality of field devices, a lot more task priorities should be adjusted. This makes the adjustment complicated.

It is an object of the present invention to enable allocation of a hardware resource to a distributed application without using a task priority effective only in a field device.

Means for Solving the Problem

In order to solve the above-described problem, according to the present invention, there is provided a distributed system in which a plurality of field devices interconnected through a network run a plurality of distributed applications in parallel, the distributed system including an importance adjustment unit to calculate absolute values representing importance of tasks in the distributed applications in the entire distributed system for all the distributed applications in the distributed system, based on distributed application importance which is designated for each of the distributed applications and which represents a priority of each of the distributed applications, and a distributed-application-based relative value which is designated for each of tasks constituting each of the distributed applications and which represents a priority of each of the tasks in each of the distributed applications.

Preferably, the importance adjustment unit further calculates a device-based relative value representing a relative value of importance of each task in each of the field devices by collecting the calculated absolute values for all the tasks to be executed in the field devices with respect to each of the field devices constituting the distributed system.

Preferably, at least one importance adjustment unit is provided in the entire distributed system, wherein the distributed system further includes a resource allocation section in each of the field devices to allocate a hardware resource of the field device concerned to each task in accordance with the device-based relative value calculated for each of the field devices by the importance adjustment unit.

Effect of the Invention

According to the present invention, it is possible to allocate a hardware resource to a distributed application without using a task priority effective only in a field device.

Particularly, because a hardware resource is allocated in accordance with distributed application importance, a hardware resource can be preferentially allocated to a distributed application having higher importance when a group of field devices run a plurality of distributed applications. Moreover, it is possible to control the resource allocation to a plurality of distributed applications on an application basis regardless of a configuration of the group of field devices to be actually operated and arrangement of tasks in the group.

Furthermore, because a hardware resource is allocated in accordance with a distributed-application-based relative value, it is possible to determine priority order of the resource allocation among the tasks regardless of the field devices. Furthermore, the priority order among tasks designed when the distributed application is developed can be maintained regardless of a configuration of the group of field devices to be actually operated and arrangement of tasks in the group.

Furthermore, because a device-based relative value is calculated based on the distributed application importance and the distributed-application-based relative value to allocate a hardware resource, it is possible to dynamically change the importance of distributed application and to dynamically change the priority order of the resource allocation to a plurality of tasks in the field device while maintaining the priority order among the tasks which are straddling a plurality of field devices and constitute the distributed application.

BRIEF DESCRIPTION OF DRAWINGS

FIG. 6 shows a data structure of a resource allocation management table 302.

FIG. 10 is a diagram for explaining a calculation method of a device-based relative value of the task importance.

FIG. 11 shows a data structure of a resource allocation management table 303 of a first modification.

FIG. 12 shows a data structure of a resource allocation management table 304 of the first modification.

FIG. 15A shows a configuration of a conventional distributed system 200.

FIG. 15B is a diagram for explaining a processing flow when a plurality of distributed applications are run in parallel.

BEST MODE FOR CARRYING OUT THE INVENTION

Embodiments according to the present invention will be described with reference to the drawings.

First, technical terms used in the embodiments will be described. In the embodiments, indices representing importance of a distributed AP in two stages which are a stage of the distributed AP and a stage of a task constituting the distributed AP are defined. Unlike a task priority which is allocated to a task by an OS specific to each field device, these indices represent an allocation priority or a processing priority in a resource common to each field device. In the embodiments, the term "importance" will be used so as to discriminate from the term "priority" used in the conventional art.

A "distributed AP importance" is defined as an index (a priority of distributed AP) indicating an importance level of resource allocation among all the distributed APs in the distributed system. Moreover, a "task importance" is defined as an index indicating an importance level of resource allocation among a plurality of tasks in a designated range. Furthermore, an "absolute value", a "distributed-AP-based relative value" and a "device-based relative value" are defined in the "task importance". The "absolute value" is defined as an index indicating an importance level among all the tasks in the entire system. The "distributed-AP-based relative value" is defined as an index (a task priority) indicating an importance level among tasks constituting one distributed AP. The "device-based relative value" is defined as an index indicating an importance level among tasks executed by one field device (see FIGS. 5 and 6).

First, a configuration in the embodiments will be described.

Figure 1:
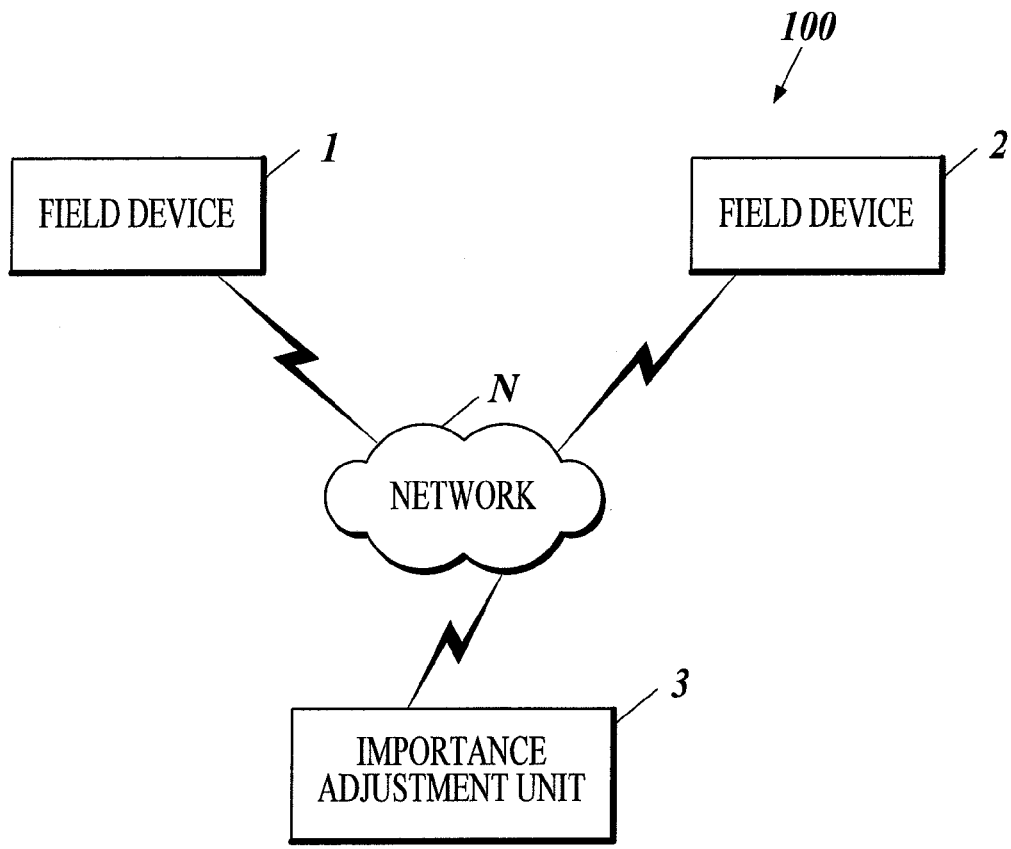
FIG. 1 shows a configuration of a distributed system according to embodiments of the present invention.

FIG. 1 shows a configuration of a distributed system 100 according to the embodiments of the present invention. As shown in FIG. 1, the distributed system 100 includes field devices 1 and 2, and an importance adjustment unit 3 for adjusting task importance of each distributed AP run in each of the field devices. The respective devices and the unit are interconnected through a network N.

Examples of the field devices 1 and 2 include a network device such as a sensor, an actuator, a controller, a communication measuring instrument, a measurement instrument, an IC tester, a camera, a router, a switch. Examples of the network N include a network such as a public line, a telephone line, an ISDN line, a wireless communication line, an exclusive line, a CATV line, an optical communication line. The number of field devices constituting the distributed system 100 is not limited to a specific value. In FIG. 1, the field devices and the importance adjustment unit 3 are separated from one another. Alternatively, one of the field devices and the importance adjustment unit 3 may be integrated.

Figure 2:
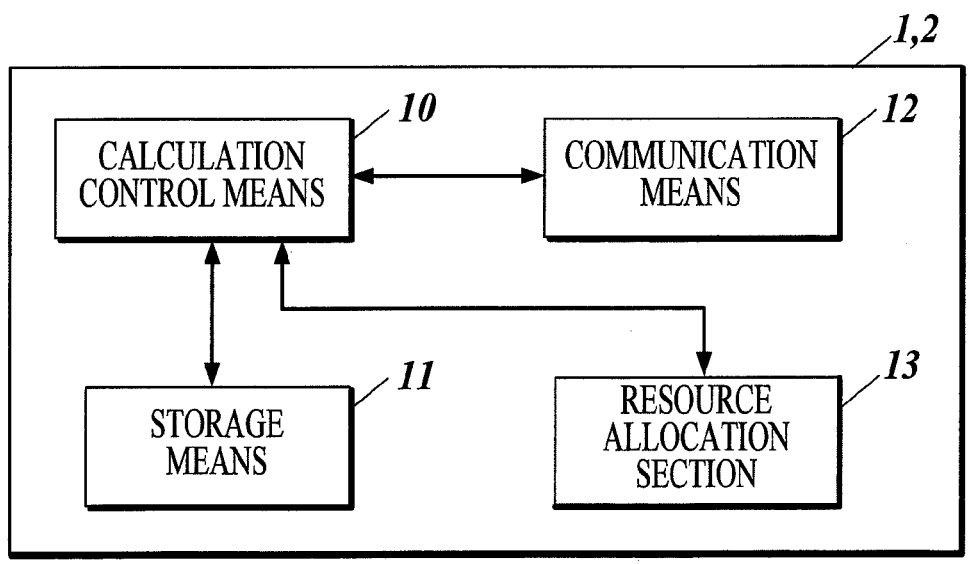
FIG. 2 is a block diagram showing a configuration of a main part of a field device constituting the distributed system.

FIG. 2 shows a configuration of a main part common to the field devices 1 and 2. As shown in FIG. 2, each of the field devices 1 and 2 includes calculation control means 10, storage means 11, communication means 12 and a resource allocation section 13.

The calculation control means 10 includes a CPU (Central Processing Unit) or the like, and controls the respective parts constituting the field device 1 (or 2).

The storage means 11 includes a hard disk, a ROM (Read Only Memory), a RAM (Random Access Memory), a flash memory or the like, and stores an application program such as a distributed application (hereinafter referred to as "distributed AP"). The communication means 12 communicates with an external device through a network N.

Figure 3:
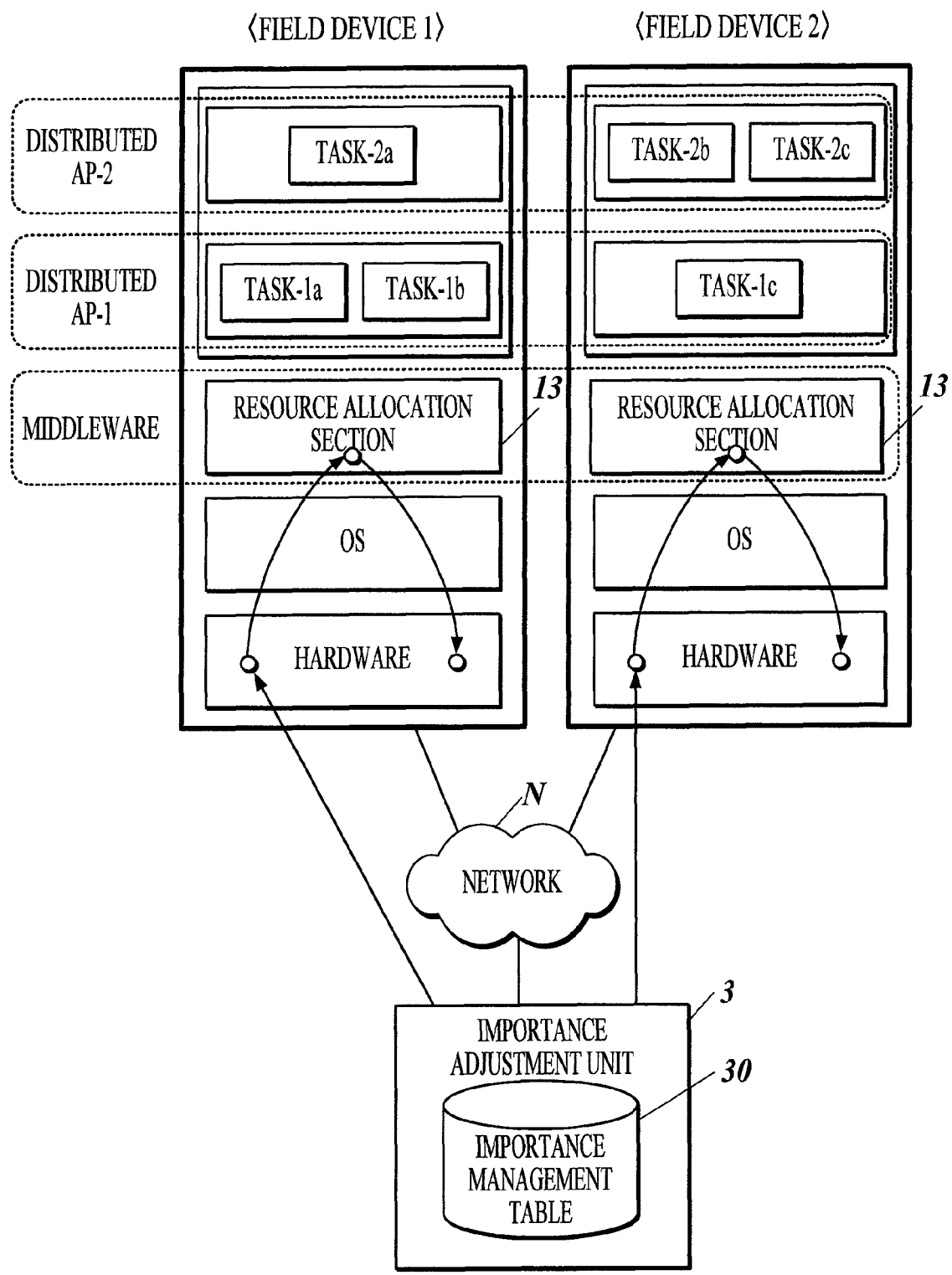
FIG. 3 shows relationships among tasks of distributed APs allocated to each field device, resource allocation sections, OS and hardware.

As shown in FIG. 3, the resource allocation section 13 allocates an actual hardware resource to each task by using a resource allocating function of an OS in accordance with a device-based relative value in task importance of a distributed AP (described later with reference to FIG. 6) which is set by the importance adjustment unit 3.

Figures 4, 5:
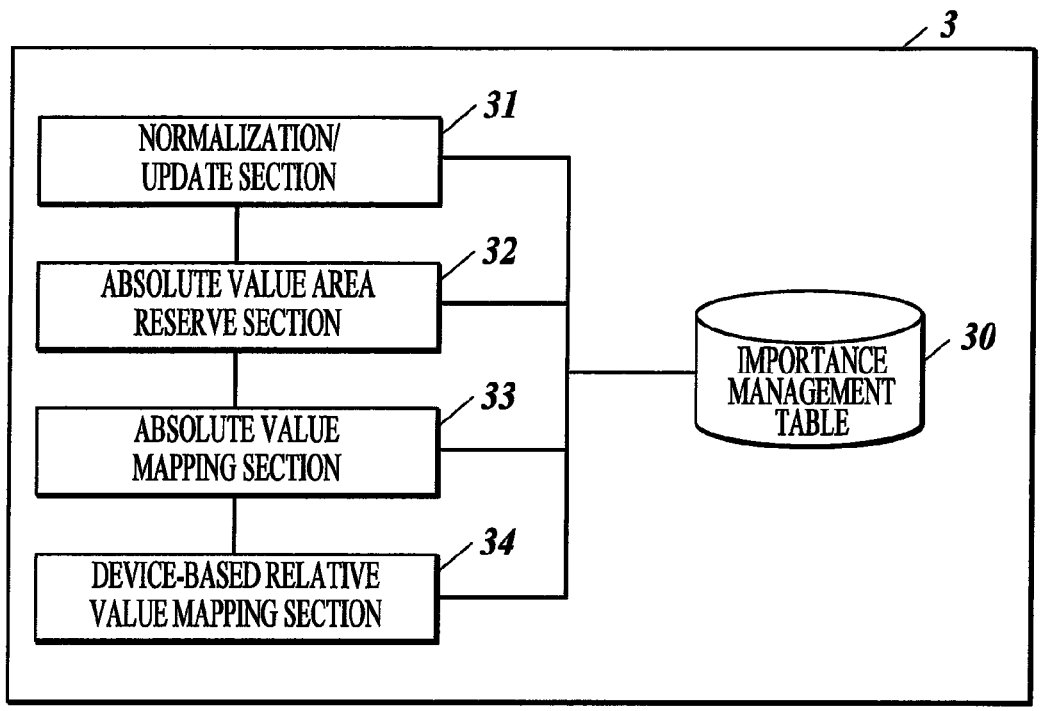
FIG. 4 is a block diagram showing a configuration of a main part of an importance adjustment unit.
FIG. 5 shows a data structure of a resource allocation management table 301.

FIG. 4 shows a configuration of a main part of the importance adjustment unit 3. As shown in FIG. 4, the importance adjustment unit 3 has an importance management table 30, and includes a normalization/update section 31, an absolute value area reserve section 32, an absolute value mapping section 33 and a device-based relative value mapping section 34.

The importance management table 30 has a resource allocation management table 301 (FIG. 5) and a resource allocation management table 302 (FIG. 6).

FIG. 5 shows a data structure of the resource allocation management table 301. As shown in FIG. 5, the resource allocation management table 301 includes the following field items for each distributed AP: "distributed AP identifier"; "distributed AP importance"; "number of tasks"; and "task importance" of tasks constituting each distributed AP.

The item "distributed AP identifier" stores identifier data for identifying distributed APs. The item "distributed AP importance" stores data of ranking representing importance of distributed APs. In FIG. 5, the ranking for each distributed AP is represented as odd numbers in the item "distributed AP importance". The data in the item "distributed AP importance" varies in accordance with processing by the normalization/update section 31.

The item "number of tasks" stores data of the number of tasks constituting each distributed AP. The item "task importance" is composed of a field item "relative value area" and a field item "absolute value area". The item "relative value area" stores data representing an area of a distributed-AP-based relative value (which is an index representing importance level among tasks constituting one distributed AP.). The item "absolute value area" stores data representing an area of an absolute value (which is an index representing importance level among all the tasks in the entire system.). The data in the item "absolute value area" varies in accordance with processing by the absolute value area reserve section 32. In FIG. 5, in the item "distributed AP importance" and the item "absolute value area", it is shown that the importance is higher as a numerical value is smaller.

FIG. 6 shows a data structure of the resource allocation management table 302. As shown in FIG. 6, the resource allocation management table 302 includes the following field items: "distributed AP (identifier)"; "distributed-AP-based task (identifier)"; "device (identifier)"; and "task importance".

The item "distributed AP (identifier)" stores identifier data for identifying distributed APs. The item "distributed-AP-based task (identifier)" stores identifier data for identifying each of the tasks constituting a distributed AP. The item "device (identifier)" stores identifier data for identifying a field device to which the task concerned is allocated. The item "task importance" includes the following field items: "distributed-AP-based relative value"; "absolute value"; and "device-based relative value". The item "distributed-based-AP relative value" stores data of a distributed-AP-based relative value (which is an index representing importance level among tasks constituting one distributed AP) for each distributed AP. The item "absolute value" stores data of an absolute value (which is an index representing importance level among all the tasks in the entire system.). The data in the item "absolute value" varies in accordance with processing by the absolute value area reserve section 32.

The item "device-based relative value" stores data of a device-based relative value (which is an index representing importance level among tasks executed by one field device) for each field device. The data in the item "device-based relative value" varies every time a task is added to the field device. In FIG. 6, in the item "distributed-AP-based relative value", the item "absolute value" and the item "device-based relative value", the importance is higher as a numerical value is smaller.

Next, the functions of the respective parts constituting the importance adjustment unit 3 will be briefly described. The details of the functions of the respective parts will be described later with reference to FIG. 7. In the following description of the functions, a distributed AP is newly added to the distributed system 100.

The normalization/update section 31 designates importance of a distributed AP to be added with respect to arrangement of importance of the existing distributed APs, and inserts the designated importance into a proper position.

The absolute value area reserve section 32 reserves absolute value areas necessary for the distributed AP to be added with respect to arrangement of absolute value areas of task importance in the existing distributed APs.

The absolute value mapping section 33 allocates absolute values of the task importance of the respective tasks to the absolute value areas reserved by the absolute value area reserve section 32.

The device-based relative value mapping section 34 calculates device-based relative values for each field device to be operated based on the absolute values of the task importance set in the processing by the absolute value mapping section 33.

Next, the operation according to the embodiments will be described.

Figure 7:
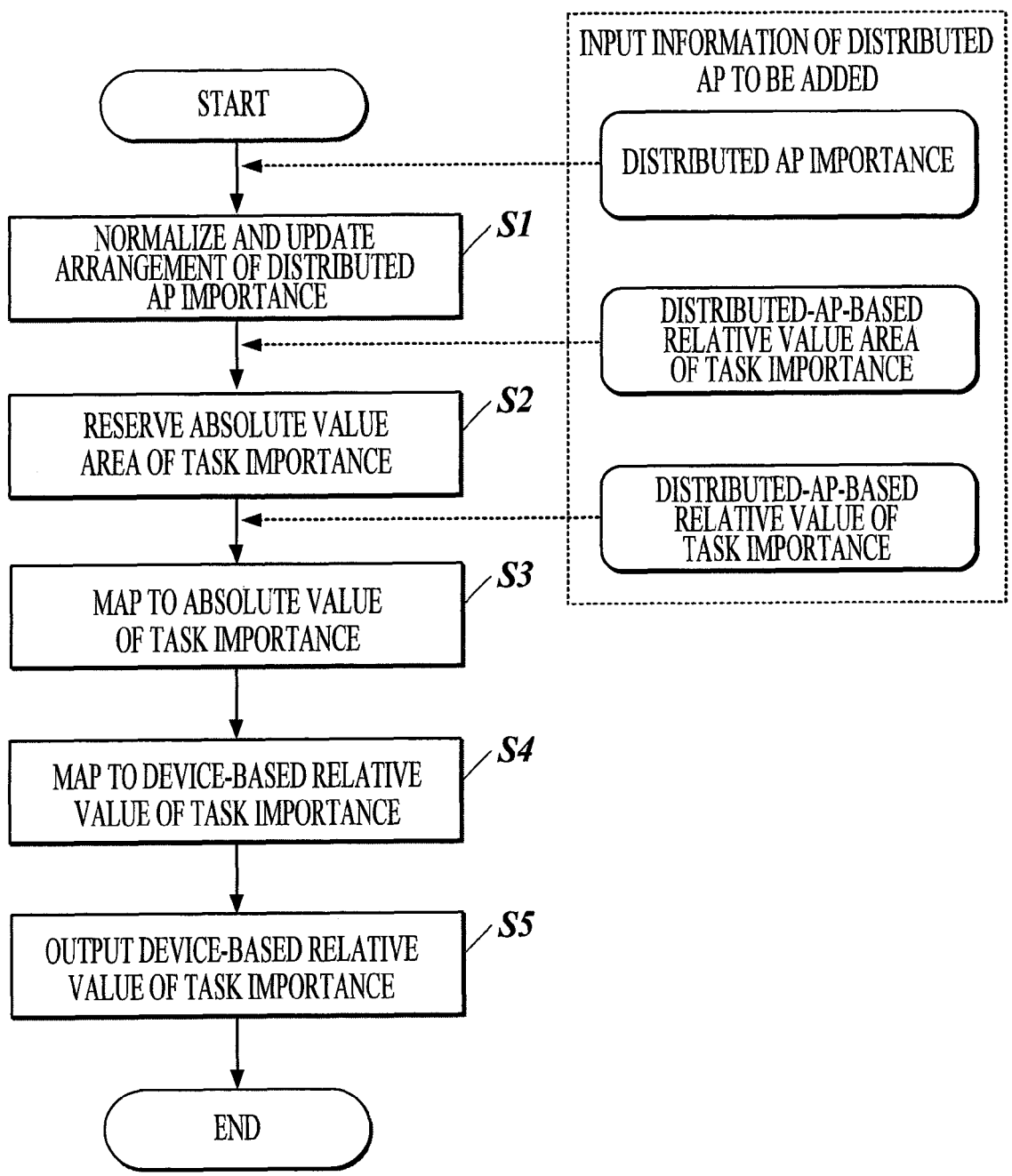
FIG. 7 is a flowchart showing processing executed by the importance adjustment unit.

The processing executed by the importance adjustment unit 3 when a distributed AP is added to the distributed system 100 will be described with reference to the flowchart of FIG. 7.

First, arrangement of distributed AP importance is normalized to update the importance management table 30 by the normalization/update section 31 (step S1). Specifically, in step S1, arrangement information of the distributed AP importance of the existing distributed APs (which are ranked with odd numbers, for example) is read out from the resource allocation management table 301. Subsequently, distributed AP importance of a distributed AP to be added is designated by an operating section (not shown) or the like. When an importance level between adjacent two levels in the arrangement of the existing distributed AP importance is designated, a value intermediate between the adjacent two levels (for example, an even number) is designated. Subsequently, the changed arrangement of the distributed AP importance is normalized (with odd numbers, for example) to update the importance management table 30.

Figure 8A:
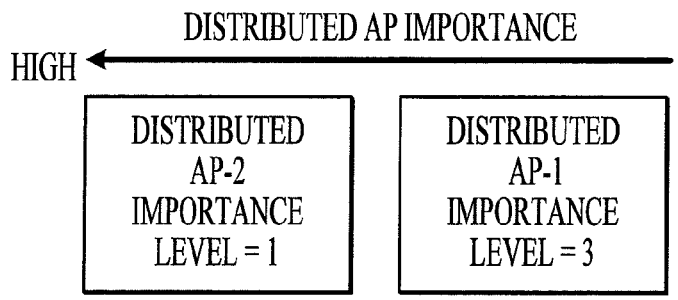
FIG. 8A shows a distributed AP-2 and a distributed AP-1 in descending order of distributed AP importance.
Figure 8B:
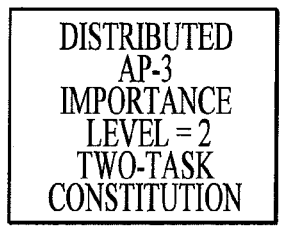
FIG. 8B is a diagram showing that a distribution importance level of a distributed AP-3 is designated 2.
Figure 8C:
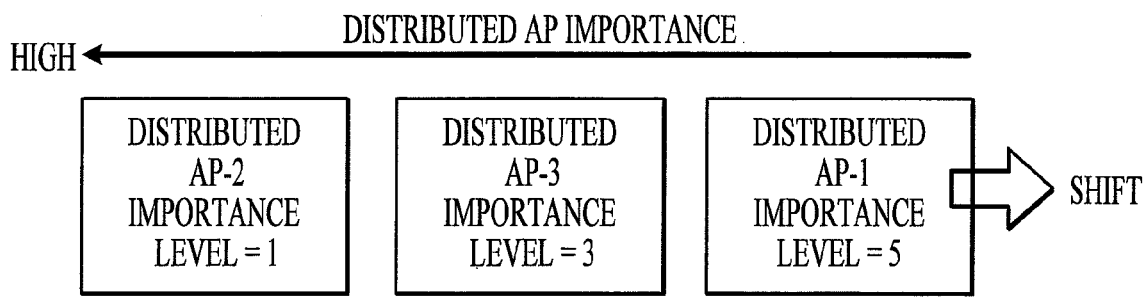
FIG. 8C is a diagram for explaining normalization and an update of arrangement of distributed AP importance.

For example, in the distributed system 100 in which the distributed AP-1 and the distributed AP-2 shown in the resource allocation management table 301 of FIG. 5 and the resource allocation management table 302 of FIG. 6 run, the distributed AP-2 (distributed AP importance level=1) and the distributed AP-1 (distributed AP importance level=3) are arranged in descending order of distributed AP importance as shown in FIG. 8A. When a distributed AP-3 is newly added to the distributed system 100, if distributed AP importance of the distributed AP-3 is designated between the distributed AP-2 and the distributed AP-1, the distributed AP importance of the distributed AP-3 is designated as level "2" as shown in FIG. 8B. Subsequently, as show in FIG. 8C, the distributed AP importance of the distributed AP-1, which is lower than the distributed AP importance of the added distributed AP-3, is shifted, and the arrangement of the distributed AP importance of the distributed AP-2, the distributed AP-3 and the distributed AP-1 is normalized with odd numbers so that the distributed AP importance thereof is set to 1, 3 and 5, respectively.

Next, by the absolute value area reserve section 32, absolute value areas necessary for the distributed AP to be added are reserved in arrangement of absolute value areas of task importance in the existing distributed APs (step S2). Specifically, in step S2, arrangement information of absolute value areas of task importance in the existing distributed APs is read out from the resource allocation management tables 301 and 302. Subsequently, a position for reserving the task importance areas necessary for the distributed AP to be added (which boundary between the existing areas) is determined from the distributed AP importance of the distributed AP to be added. If the distributed AP importance of the distributed AP to be added is the same as that of the existing distributed AP, any one of the absolute value areas is enlarged or reduced to align the absolute value areas. The task importance in these areas (the distributed-AP-based relative value and the absolute value) is also enlarged or reduced at equal rate to be aligned. Furthermore, the value of the task importance is normalized (with an integer value, for example). The absolute values of the task importance of the tasks constituting all the distributed APs whose distributed AP importance is lower than that of the distributed AP to be added are shifted to lower importance by a required amount (corresponding to the relative value area), and the importance management table 30 is updated.

Figure 9A:
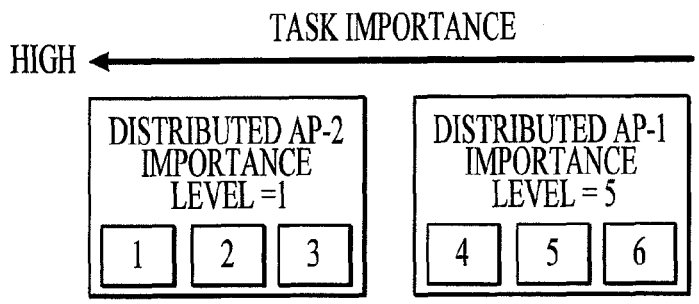
FIG. 9A shows arrangement of absolute values of task importance in a distributed AP-2 (distributed AP importance level=1) and a distributed AP-1 (distributed AP importance level=5).
Figure 9B:
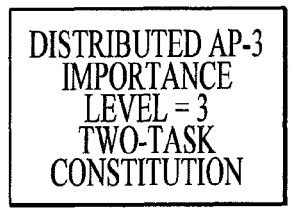
FIG. 9B is a diagram showing that a distributed AP-3 which has two tasks and whose distributed AP importance level is 3 is added.
Figure 9C:
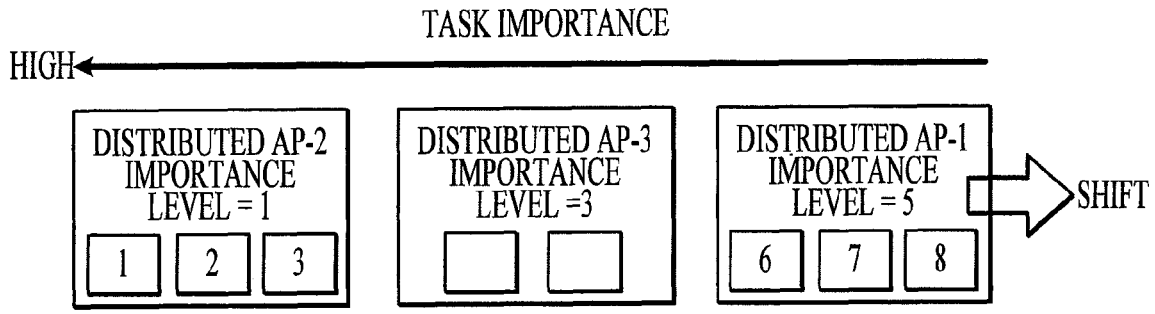
FIG. 9C is a diagram showing that the distributed AP-3 enters into the arrangement of absolute values of task importance.

For example, assume that the absolute value areas of the task importance in the existing distributed AP-2 (distributed AP importance level=1) and AP-1 (distributed AP importance level=5) are 1 to 3 and 4 to 6 respectively as shown in FIG. 9A. When a distributed AP-3 which has two tasks and whose distributed AP importance level is 3 is added as shown in FIG. 9B, the absolute value areas of the task importance are reserved at an intermediate position between the existing two distributed APs. That is, as shown in FIG. 9C, the distributed AP-3 is entered into the arrangement of the absolute value areas of the task importance, and the task importance of the distributed AP-1 which is lower in distributed AP importance than the distributed AP-3 is shifted. Since the number of tasks of the added distributed AP-3 is 2, the absolute values of the task importance of the distributed AP-1 are shifted by two. That is, the absolute values become 6 to 8.

Next, mapping to absolute values of the task importance of the added distributed AP is executed by the absolute value mapping section 33 (step S3). This is the processing of allocating the absolute values of the task importance of the respective tasks to the absolute value areas reserved in step S2. Specifically, distributed-AP-based relative values of the tasks constituting the distributed AP to be added are designated by the operating section (not shown) or the like, and are converted to values (absolute values) in the absolute value areas corresponding to the distributed-AP-based relative values. The absolute values are registered in the importance management table 30 (the resource allocation management table 302).

Figure 9D:
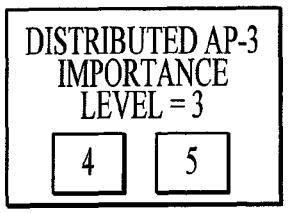
FIG. 9D is a diagram showing that values of 4 and 5 are assigned as absolute values of task importance of the distributed AP-3.

For example, when the absolute value areas of the task importance of the distributed AP-3 are reserved as shown in FIG. 9C, the absolute values 4 and 5 of the task importance of the distributed AP-3 are allocated to the reserved absolute value areas as shown in FIG. 9D.

After the absolute values of the task importance are allocated, the mapping to device-based relative values from the absolute values of the task importance is executed by the device-based relative value mapping section 34 (step S4). This is the processing of allocating the relative values for each field device to be operated with respect to the absolute values of the task importance obtained in the processing of step S3. Specifically, the absolute values of the task importance of all the tasks to be executed in the field device concerned are read from the resource allocation management table 302. Then, the absolute values are converted to the device-based relative values representing the ranking of importance in the field device, and the obtained device-based relative values are registered in the importance management table 30 (the resource allocation management table 302).

For example, as shown in FIG. 10, assume that two tasks constituting the distributed AP-3 to be added are a task-3*a* and a task-3*b*, and the absolute values of the task importance thereof are 5 and 4, respectively. Moreover, assume that the task-3*a* is assumed to be allocated to the field device 1 and the task-3*b* is allocated to the field device 2. As shown in FIG. 10, since the tasks allocated to the field device 1 are a task-2*a*, a task-3*a*, a task-1*a* and a task-1*b* in descending order of task importance, the device-based relative values of the tasks to be executed in the field device 1 are calculated by converting the absolute values of the task importance of the respective tasks to 1, 2, 3 and 4. Likewise, since the tasks allocated to the field device 2 are a task-2*c*, a task-2*b*, a task-3*b* and a task-1*c* in descending order of task importance, the device-based relative values of the tasks to be executed in the field device 2 are calculated by converting the absolute values of the task importance of the respective tasks to 1, 2, 3 and 4.

After the device-based relative values of the respective field devices are obtained, data of the device-based relative values of the respective field devices obtained in step S4 is outputted to the respective field devices through the network N (step S5). Then, resource allocation is requested to the resource allocation section 13 of each field device, and then the processing in the importance adjustment unit 3 is finished.

In the resource allocation section 13 of each field device to which the resource allocation is requested from the importance adjustment unit 3, a hardware resource of the field device is distributed to each task in the ranking order indicated by the device-based relative values of the task importance. The task priority is also converted as one resource from the device-based relative value of the task importance and requested to an OS.

As described above, according to the distributed system 100 of the embodiments, a resource of the field device is allocated in accordance with the "distributed AP importance" that is priority designated for each distributed AP. Therefore, a hardware resource can be preferentially allocated to a distributed AP having higher importance when a group of field devices run a plurality of distributed APs. Furthermore, it is possible to control the resource allocation to a plurality of distributed APs on an application basis regardless of a configuration of the group of field devices to be actually operated and arrangement of tasks in the group.

Since the resource allocation is performed in accordance with "distributed-AP-based relative value of task importance" that is priority designated for each of the tasks constituting the distributed AP, it is possible to determine the priority order of the resource allocation among the tasks regardless of the field devices. Furthermore, the priority order among tasks designed when the distributed AP is developed can be maintained regardless of a configuration of the group of field devices to be actually operated and arrangement of tasks in the group.

Furthermore, since the "distributed AP importance" and the "the distributed-AP-based relative value of task importance" are designated to calculate the "device-based relative value of task importance" which is ranked in the field device and to perform the resource allocation in the field device, it is possible to dynamically change the importance of distributed AP and to dynamically change the priority order of the resource allocation to a plurality of tasks in the field device (for example, the task priority) while maintaining the priority order among the tasks which are straddling a plurality of field devices and constitute the distributed AP.

First and second modifications of the distributed system 100 according to the embodiments will be described below.

<First Modification>

If range of the task priorities of OS which is installed into the field device is smaller than areas of the device-based relative values of the task importance, an area which can be overlapped in the task importance area is designated, whereby the area of the task importance can be overlapped. FIG. 11 shows a data structure of a resource allocation management table 303 in the first modification. FIG. 12 shows a data structure of a resource allocation management table 304 in the first modification.

The resource allocation management table 303 is provided with a field item "overlap area" in the item "task importance" in addition to the field items of the resource allocation management table 301. The item "overlap area" stores data representing the size of the overlap area in the task importance with respect to a neighboring distributed AP having a lower distributed AP importance. FIGS. 11 and 12 show an example that the overlap area of the task importance of the distributed AP-2 with respect to the neighboring distributed AP-1 having a lower distributed AP importance is equal to 2 (the area of absolute values=2 and 3).

Figure 13A:
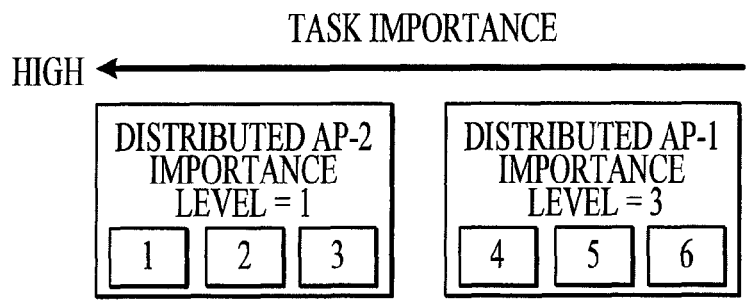
FIG. 13A shows an example of arrangement of absolute values of task importance in the existing distributed AP-2 and the distributed AP-1.
Figure 13B:
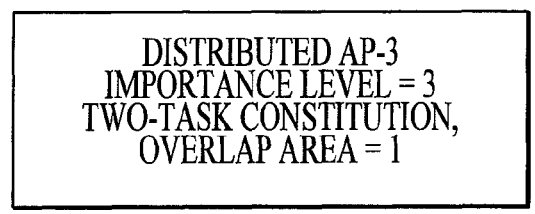
FIG. 13B is a diagram showing that a distributed AP-3 which has two tasks and has a distributed AP importance level of 3 is added to the two existing distributed AP.
Figure 13C:
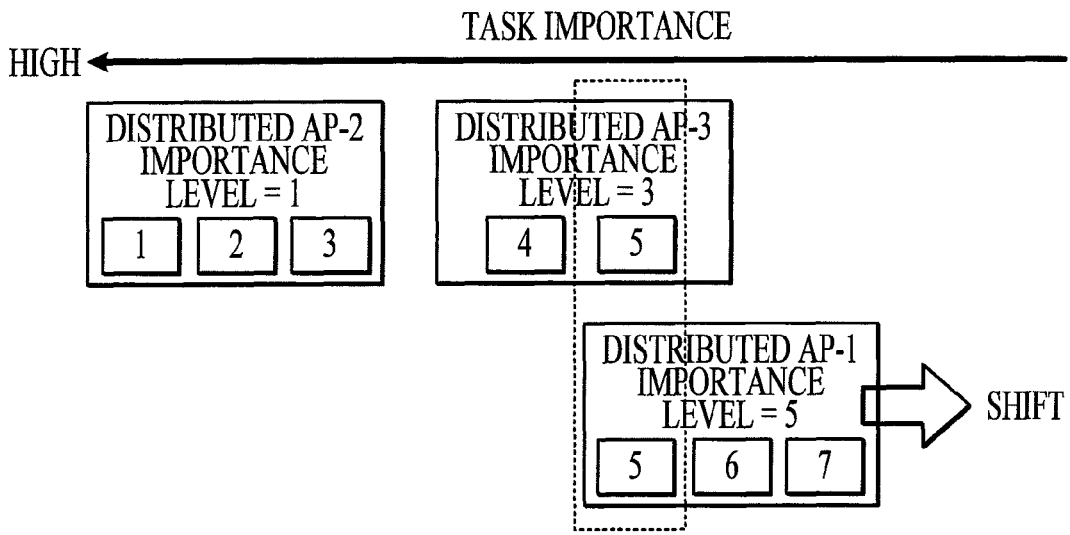
FIG. 13C is a diagram for explaining allocation of task importance when an overlap area is designated.

FIG. 13A shows an example of arrangement of the absolute value areas in the task importance of the existing distributed AP-2 and distributed AP-1. Assume that a distributed AP-3 which has two tasks and whose distributed AP importance is 3 is added to the two existing distributed APs as shown in FIG. 13B. The overlap area in the task importance of the distributed AP-3 with respect to the neighboring distributed AP-1 having the lower importance is equal to 1. In this case, when the absolute value areas in the task importance are reserved between the two existing distributed APs, as shown in FIG. 13C, the distributed AP-3 is entered into the arrangement of the absolute value areas in the task importance, the overlap area in the task importance is allocated with an overlap, and the task importance of the distributed AP-1 having lower importance is shifted.

According to the first modification, since an overlap area in the task importance is designated, a higher task priority can be allocated to a task to be prioritized by setting the task importance of a part of the tasks constituting the distributed AP to be equal to or lower than that of a distributed AP having lower importance.

<Second Modification>

In the second modification, an example that a new distributed AP can be added without adversely affecting a distributed AP which has already run will be described.

Figure 14:
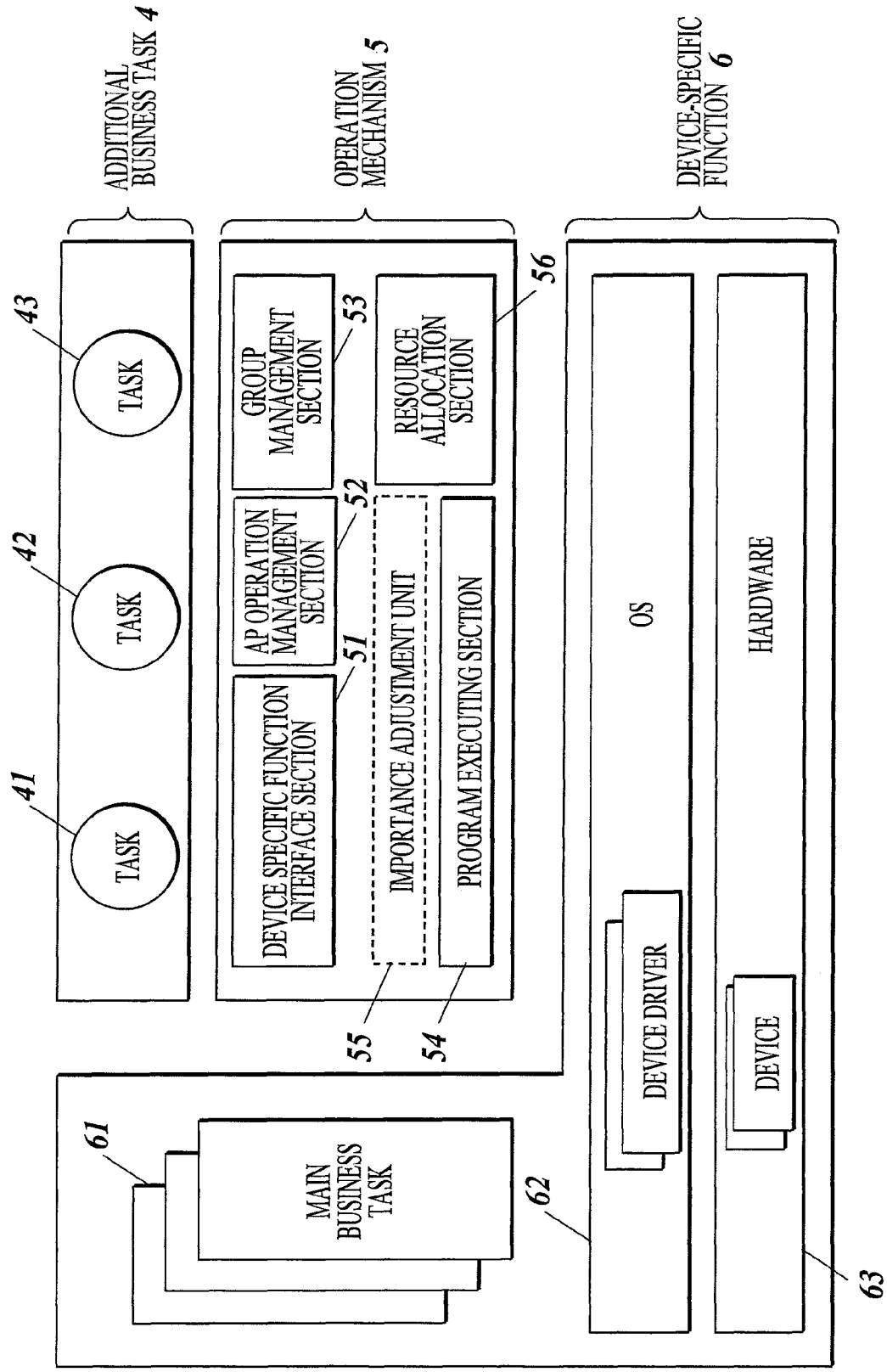
FIG. 14 shows a configuration of an operation mechanism of a field device in a second modification.

FIG. 14 shows relationships among a main business task 61 operating in a field device (specifically, an application program), a device specific function 6 including an OS 62 for executing the main business task and a hardware resource 63 such as communication means, I/O, etc., an operation mechanism 5, and an additional business task 4 (specifically, an distributed application program) having tasks 41 to 43.

The operation mechanism 5 includes a device specific function interface section 51, an AP operation management section 52, a group management section 53, a program executing section 54, an importance adjustment unit 55 and a resource allocation section 56.

The device specific function interface section 51 is an interface for using the device specific function 6 including the OS 62 and the hardware resource 63. The AP operation management section 52 controls generation, a boot, stop and deletion of the additional business task 4 and also controls communication among additional business tasks. The group management section 53 carries out group management of the additional business task 4. The unit of distributed AP is handled as a group in the group management section 53. The program executing section 54 executes the program of the additional business task 4.

As with the importance adjustment unit 3 of the above-described embodiments, the importance adjustment unit 55 adjusts task importance of each distributed AP to be executed in the field device. The "distributed AP importance" of a distributed AP to be newly added is set to be lower than the distributed AP importance of the existing distributed APs. FIG. 14 shows an example in which the importance adjustment unit 55 is provided in the field device. One importance adjustment unit 55 may be provided on the network N.

As with the resource allocation section 13 of the above-described embodiments, the resource allocation section 56 allocates the hardware resource 63 of the field device to each task by using the resource allocating function of the OS 62 in accordance with a device-based relative value of the task importance of the distributed AP, which is set by the importance adjustment unit 55.

According to the second modification, since an "absolute value" of task importance of a task in the distributed AP to be newly added is definitely lower than that of task importance of tasks constituting the existing distributed AP, much the same is true on a "device-based relative value" of the task importance. Accordingly, a lower task priority is allocated to the task to be added, and thus the operation of the distributed AP which has been already run is not adversely affected.

INDUSTRIAL APPLICABILITY

The present invention is applicable to a distributed system in which a plurality of field devices interconnected through a network run a plurality of distributed applications in parallel.

DESCRIPTION OF REFERENCE NUMERALS

1, 2 field device
3, 55 importance adjustment unit
10 calculation control means
11 storage means
12 communication means
13 resource allocation section
30 importance management table
301 to 304 resource allocation management table
31 normalization/update section
32 absolute value area reserve section
33 absolute value mapping section
34 device-based relative value mapping section
100 distributed system

The invention claimed is:

1. A distributed system comprising:
a plurality of field devices interconnected through a network run a plurality of distributed applications in parallel,
an importance adjustment unit to calculate absolute values representing priority of tasks in the distributed applications in the entire distributed system for all the distributed applications in the distributed system, based on distributed application importance which is designated for each of the distributed applications and which represents importance of each of the distributed applications, and a distributed-application-based relative value which is designated for each of tasks constituting each of the distributed applications and which represents a priority of each of the tasks in each of the distributed applications,
wherein the tasks which straddle the plurality of field devices are prioritized based on the calculated absolute values, and wherein,
the importance adjustment unit further calculates a device-based relative value representing a relative value of priority of each task in each of the field devices by collecting the calculated absolute values for all the tasks to be executed in the field devices with respect to each of the field devices constituting the distributed system;
the importance adjustment unit further comprising:
a normalization/update section configured to designate the importance of additional distributed applications to be added with the distributed applications;
an absolute value reserve section configured to reserve absolute value areas for the additional distributed applications to be added;
an absolute value mapping section configured to allocate the calculated absolute values to the reserved absolute value areas; and
a device-based relative value mapping section configured to calculate the device-based relative values for each of the field devices based on the calculated absolute values;
the distributed system further comprises a resource allocation section in each of the field devices to allocate hardware resource of the field device to each task in accordance with the device-based relative value calculated for each of the field devices.

2. The distributed system according to claim 1, wherein,
at least one importance adjustment unit is provided in the entire distributed system.

* * * * *